(No Model.)
J. Y. FAIRMAN.
ICE CRUSHER OR BREAKER.
No. 308,760. Patented Dec. 2, 1884.
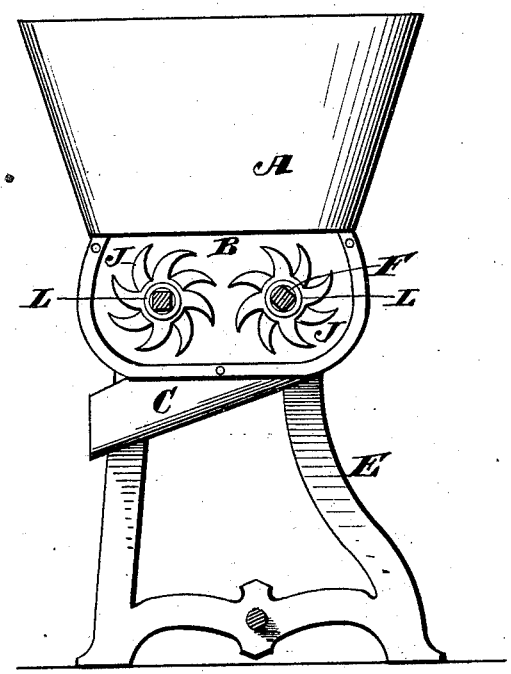
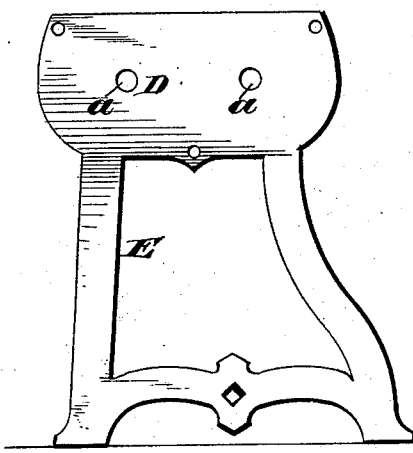
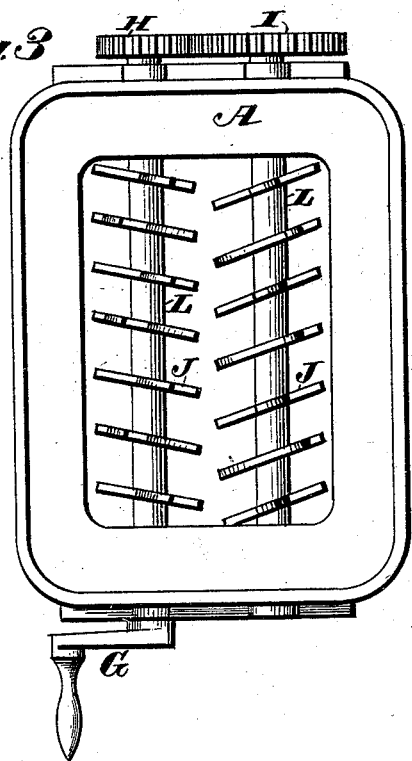
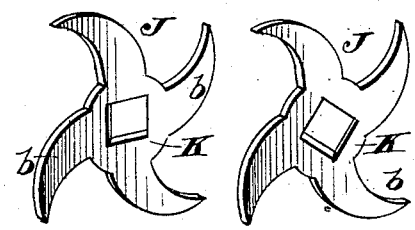
Witnesses
Robert Everett
J. A. Rutherford
Inventor:
J. Yale Fairman,
By James L. Norris.
Atty.

UNITED STATES PATENT OFFICE.

J. YALE FAIRMAN, OF NEW HAVEN, CONNECTICUT.

ICE CRUSHER OR BREAKER.

SPECIFICATION forming part of Letters Patent No. 308,760, dated December 2, 1884.

Application filed September 22, 1884. (No model.)

*To all whom it may concern:*

Be it known that I, J. YALE FAIRMAN, a citizen of the United States, residing at New Haven, in the county of New Haven, and State of Connecticut, have invented new and useful Improvements in Ice Crushers or Breakers, of which the following is a specification.

My invention relates to ice crushers or breakers, and especially to that class employing toothed or cutting shafts which may be revolved in opposite directions and at different speeds, such as was patented to me January 15, 1884, No. 291,999; and the invention has for its object to provide for setting the knives at an oblique or other inclined angle to the length of their shaft, so as to bring the points of the blades or knives of one shaft intermediate of those of the other shaft without the necessity of bending the knives or blades, whereby they are rendered stronger, and will crush or break the ice very effectively.

The invention consists in the construction and combination of parts, as will be hereinafter particularly described and pointed out.

Figure 1 of the drawings is a side view of the crusher with one of the legs removed; Fig. 2, a side view of the removed leg; Fig. 3, a plan view of the crusher; Fig. 4, a perspective of two of the cutters; Fig. 5, a cross-section through a washer.

In the drawings, the letter A designates the hopper, preferably of the form shown, with open sides B to its base, and a delivery-chute, C, below the base, the said parts preferably being cast or otherwise formed in one piece. The sides of the base are preferably formed with flanges for the passage of bolts, which secure the bearings for the revolving-shafts for the knives or blades thereto, although such bolts may be made long enough to pass from one side through to the other of the hopper. The bearings D for the shafts form removable sides for the openings B in the hopper, and are made with holes *a* of the same diameter on both sides of the hopper, for the ends of the shafts to turn in, said holes being either drilled or cast in the bearings, as most convenient or desirable. These bearings form the upper part of the legs E, and thus render the crusher very steady while being operated.

The shafts F rest in said bearings, and have a crank, G, attached to the end of one of them, and gear-wheels H I, of the same or varying diameter, connected to the opposite ends and meshing with each other. The knives J, secured to said shafts, are preferably formed of a series of arms or blades, *b*, having a common hub, K, the edges of the blades being preferably curved as shown. The opening in the hub for the shaft is formed obliquely to the length of the blade, so that when the blades are secured to the shaft they will set obliquely to the length thereof, as illustrated. The washers L, which separate the series of knives on each shaft, have their faces inclined to correspond to the set of the knives. The knives on one shaft are placed so that their points or ends will be intermediate the knives of the other shaft, or opposite the spaces between such knives, and yet preferably so as not to mesh therewith, as illustrated. The blades or knives on one shaft will incline or extend from the shaft in an opposite direction to those of the other shaft, so as to more effectually crush or break the ice, as shown in Fig. 3 of the drawings. This manner of applying and arranging the knives or blades renders them very effective in crushing or breaking the ice, and permits them to be made very strong.

It is obvious that the openings in the hubs might be made straight through them instead of obliquely, and the inclined faces of the washers be relied on to give the inclination to the blades or knives, the openings in such case being large enough to allow the necessary play or adjustment of the hubs; but the other form is the best, as the knives are then more firmly or rigidly held to their position.

The several parts are cheap to construct, and whenever necessary one part can be readily supplanted or replaced by another.

I am aware that ice-crushers have been composed of a hopper containing revolving shafts provided with alternating ice-crushing knives, and also that in machines for various purposes saws and similar cutters have been set at an oblique angle to the axis of the shaft which carries them; and, therefore, I do not wish to be understood as broadly claiming such features, my invention comprising simply the specific construction and combination of parts described and claimed, whereby a simple, economical, efficient, and portable ice-crusher is produced.

Having thus described my invention, what I claim is—

A portable ice-crushing apparatus consisting of a hopper for receiving the ice, two parallel revolving shafts journaled in the ends of the hopper and geared together at one end, and a series of ice-crushing knives on each shaft set obliquely to the axis thereof, the series of oblique knives on one shaft alternating with those on the other shaft, substantially as and for the purpose described.

In testimony whereof I affix my signature in presence of two witnesses.

J. YALE FAIRMAN.

Witnesses:
CHAS. R. WHEDON,
I. B. KLOCK.